United States Patent [19]

Raynes et al.

[11] Patent Number: 5,541,753
[45] Date of Patent: Jul. 30, 1996

[54] LIQUID CRYSTAL DISPLAY AND DEVICE HAVING A TOTAL RETARDANCE OF (M+1) λ/2 AND (Mλ/2) AT FIRST AND SECOND OPERATING VOLTAGES

[75] Inventors: Edward P. Raynes, Worcestershire; Jonathan Harrold, Oxfordshire, both of United Kingdom; Shuichi Kohzaki, Nara-ken, Japan

[73] Assignee: Sharp Kabushiki Kaisha, Osaka, Japan

[21] Appl. No.: 208,986

[22] Filed: Mar. 10, 1994

[30] Foreign Application Priority Data

Mar. 15, 1993 [GB] United Kingdom ............... 9305277

[51] Int. Cl.⁶ .................. G02F 1/137; G02F 1/1335; G02F 1/13
[52] U.S. Cl. ................. 359/94; 359/73; 359/63; 359/102
[58] Field of Search .............. 359/73, 63, 102, 359/94

[56] References Cited

U.S. PATENT DOCUMENTS

| | | | |
|---|---|---|---|
| 3,784,280 | 1/1974 | Bigelow | 350/150 |
| 4,385,806 | 5/1983 | Fergason | 350/347 |
| 5,068,749 | 11/1991 | Patel | 359/94 |
| 5,091,794 | 2/1992 | Suzuki | 359/63 |
| 5,231,522 | 7/1993 | Sumiyoshi | 359/53 |
| 5,303,075 | 4/1994 | Wada et al. | 359/73 |

FOREIGN PATENT DOCUMENTS 0463723  1/1992  European Pat. Off. .

OTHER PUBLICATIONS

Search Report for European Appl. 94301743.4, mailed Jul. 4, 1994.
Wu et al., "Mylar–Film Compensated π and Parallel–A-ligned Liquid Crystal Cells for Direct–View and Projection Displays, Appl. Phys., Lett." 64, (16), Apr. 1994, pp. 2047–2049.
Bos et al., "The pi–Cell: A Fast Liquid Crystal Optical Switching Device", Mol Crys. Liq Cryst., 1984, vol. 113, pp. 329–339 (no month).

Primary Examiner—Rolf Hille
Assistant Examiner—Fetsum Abraham

[57] ABSTRACT

A liquid crystal display comprises a nematic liquid crystal layer disposed between alignment layers. The alignment layers are formed on substrates which also carry display control electrodes connected to a drive circuit. Polarisers are provided on opposite sides of the substrates. The alignment layers are arranged such that the liquid crystal molecule pretilt angles at the surfaces of the alignment layers are parallel. The liquid crystal layer has a retardance equal to $(M+1)\lambda/2$ at a first operating voltage and $M\lambda/2$ at a second operating voltage, where M is an integer greater than zero or less than minus one and λ is a wavelength of visible light.

31 Claims, 14 Drawing Sheets

LIQUID CRYSTAL DISPLAY AND DEVICE HAVING A TOTAL RETARDANCE OF (M+1) λ/2 AND (Mλ/2) AT FIRST AND SECOND OPERATING VOLTAGES

The invention relates to a liquid crystal display, for instance of the active matrix drive type. The invention also relates to a liquid crystal device which may be used in displays or in other applications with visible light or other optical radiation.

Twisted nematic liquid crystal displays are widely used as numeral segment type displays for watches and pocket calculators. For high information content displays active elements, such as thin film transistors, are formed on the transmitting substrate of the liquid crystal display element and function as switching elements for selectively driving the picture element electrodes which apply voltages to the liquid crystal. Red, green and blue colour filter layers are used to provide a colour display.

The well known high information content liquid crystal display systems are:

(a) the active drive twisted nematic (hereinafter referred to as TN) liquid crystal display system, characterised by the 90° twisted orientation of the nematic liquid crystal molecules; and (b) the multiplex driven super-twisted nematic (hereinafter referred to as STN) liquid crystal display system, which uses the sharpness of transmittance vs. voltage applied to the liquid crystal characteristics found by setting the nematic liquid crystal molecule twist angle to 180° or more.

Since the multiplex drive STN liquid crystal display system causes specific colouring, an optical compensator is provided for black-and-white displays. Liquid crystal displays of this type are classified into two subgroups by the type of applied optical compensator, namely: (b-1) the double-super-twisted nematic liquid crystal display system, which uses a display liquid crystal cell and a liquid crystal cell inversely twisted; and (b-2) the film compensated liquid crystal display system, which utilises an optically anisotropic film. Owing to smaller weight and lower cost, the (b-2) film compensated liquid crystal display system is preferred.

Active drive TN liquid crystal display systems as described at (a) above are divided into two groups, namely: (a-1) the normally black system characterised by parallel arrangement of the polarisation directions of paired polarising plates to provide black indication while no voltage is applied to the liquid crystal layer (OFF state); and (a-2) the normally white system characterised by mutual orthogonal arrangement of the polarisation directions to provide white indication in the OFF state. It is considered that the normally white display system is superior in display contrast, colour reproducibility and independence of display upon viewing angle of displayed picture.

Because the liquid crystal molecules have anisotropy of refractive index and are aligned with a tilt with respect to the upper and lower electrode substrates, particularly when the display is switched by an applied voltage, the contrast of the picture shown by the TN liquid crystal type of display which is currently used varies depending on the viewing angle of the user, resulting in an increase of dependence of display contrast upon viewing angle. If the viewing angle is increased away from the direction of the screen normal in the direction in which display contrast is improved and exceeds a specific angle value, the contrast is inverted (hereinafter this phenomenon is referred to as inversion).

In order to reduce the dependence upon viewing angle, an attempt has been made to compensate for the phase difference between ordinary light and extraordinary light components by providing a phase plate or film arranged such that the direction of one of the principal indices of refraction is parallel to the surface normal between the liquid crystal layer and the polarising plate. Nevertheless, even when such a phase plate is used, there is only limited improvement in the above mentioned contrast inversion.

The term "parallel" as used herein is defined to mean spaced apart by a constant distance and pointing in the same direction. Thus, "parallel" is different from "anti-parallel", which means spaced apart by a constant distance and pointing in opposite directions.

U.S. Pat. No. 4,384,806 discloses a liquid crystal display in which a nematic liquid crystal is disposed between glass plates coated with transparent conductive material to form electrodes. The surfaces of the electrodes are rubbed so as to act as alignment layers for the liquid crystal molecules in contact therewith. In particular, the alignment layers are arranged such that the liquid crystal molecule pretilt angles at the alignment layer surfaces are anti-parallel to each other. In order to improve the off-axis viewing angle of such a display, at least two retardation plate devices are provided.

Boss & Koehler/Beran (Mol. Cryst. Liq Cryst., 113, 329(1984)) discloses a liquid crystal display element utilising a pi or π cell (hereinafter referred to as pi-cell) for increasing the switching speed and decreasing the dependence on viewing angle. In the pi-cell as shown in FIG. 4 of the accompanying drawings, the surfaces are treated so that the liquid crystal molecule pretilt angles on the upper and lower substrates are parallel to each other. Because of this, the directions of tilt of liquid crystal molecules in the upper and lower halves of the liquid crystal layer are arranged opposite to each other, even in the presence of an applied voltage. Such an arrangement partially compensates for the phase difference between the ordinary light and extraordinary light components in the nematic liquid crystal layer, thereby reducing the dependence upon viewing angle. However, since the pi-cell proposed by Boss is a high voltage drive liquid crystal display element which needs voltages of 20 to 30 V, it cannot be applied to existing active matrix drive liquid crystal elements whose drive voltages are limited to about 5 V or less, because of the use of thin film transistors (hereinafter referred to as TFTs) formed, for instance, of amorphous silicon.

According to a first aspect of the invention, there is provided a liquid crystal device as defined in the appended claim 1.

According to a second aspect of the invention, there is provided a liquid crystal display as defined in the appended claim 15.

According to a third aspect of the invention, there is provided a liquid crystal device as defined in the appended claim 24.

According to a fourth aspect of the invention, there is provided a liquid crystal device as defined in the appended claim 28.

Preferred embodiments of the invention are defined in the other appended claims.

It is thus possible to provide a liquid crystal display element which permits active matrix drive with drive voltages limited to about 5 V, and which has wide viewing angle characteristics. Contrast change, colouring, and inversion as a function of angle of view can all be reduced or eliminated.

The invention will be further described, by way of example, with reference to the accompanying drawings, in which.

Figure 6:
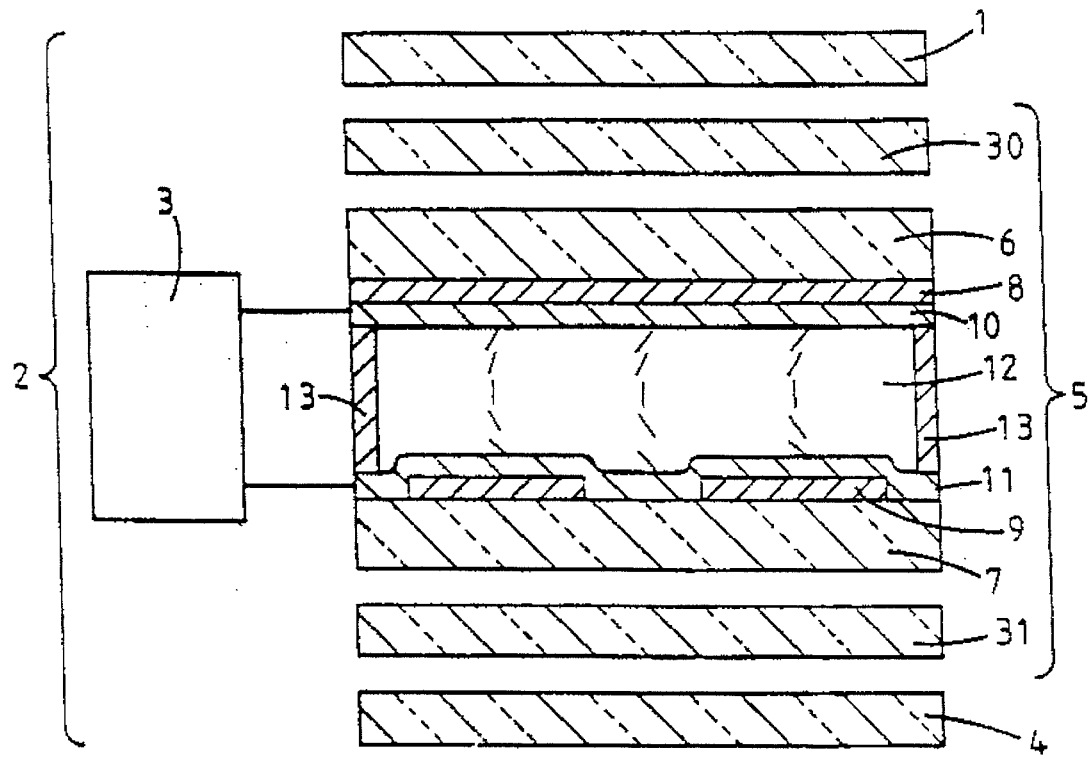
FIG. 6 is a diagrammatic cross sectional view of a pi-cell type liquid crystal display constituting another embodiment of the invention.
Figure 20:
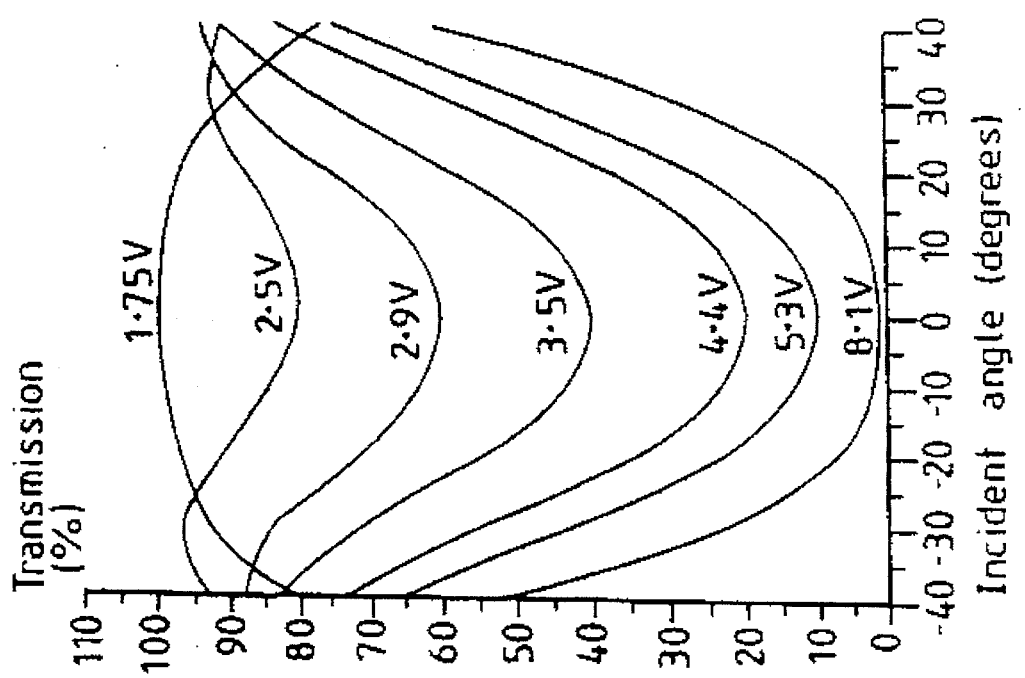
FIGS. 19 and 20 are graphs similar to FIGS. 17 and 18, respectively, for a display of the type shown in FIG. 6.
Figure 19:
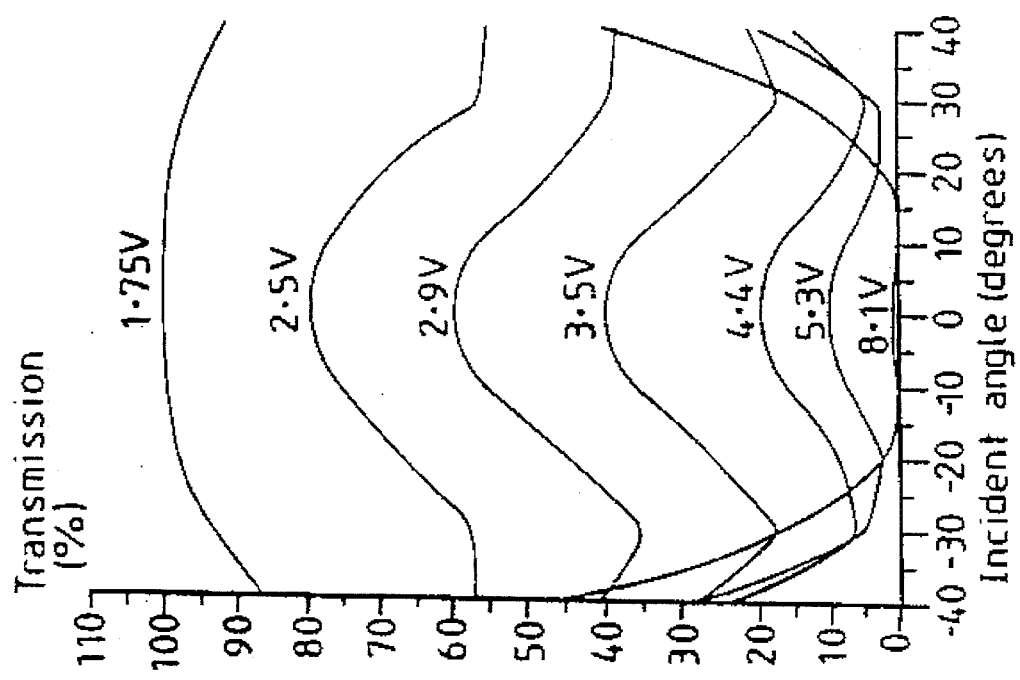
Figure 22:
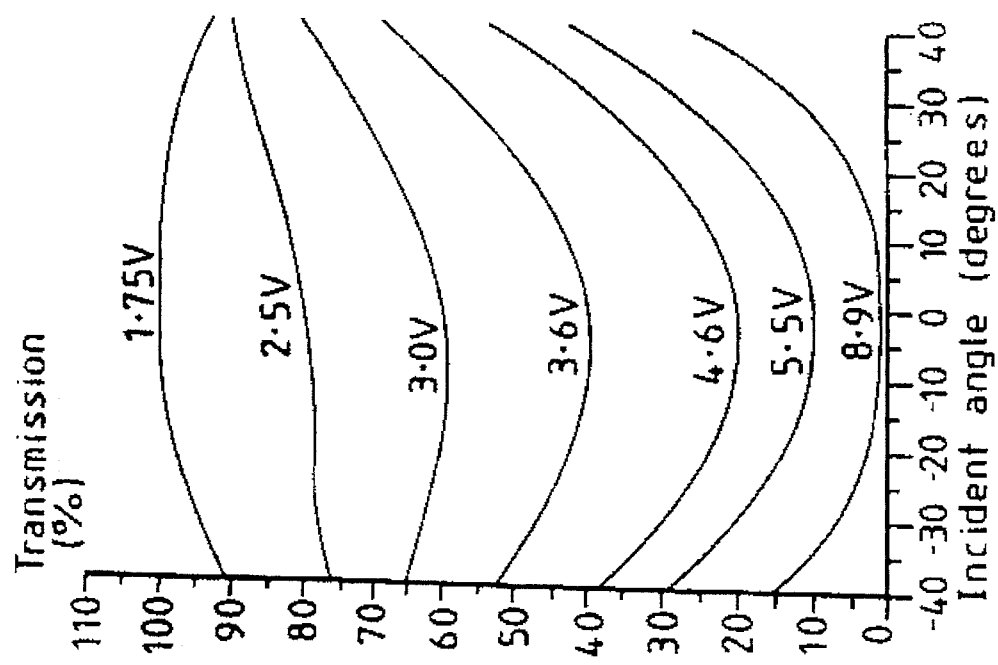
Figure 21:
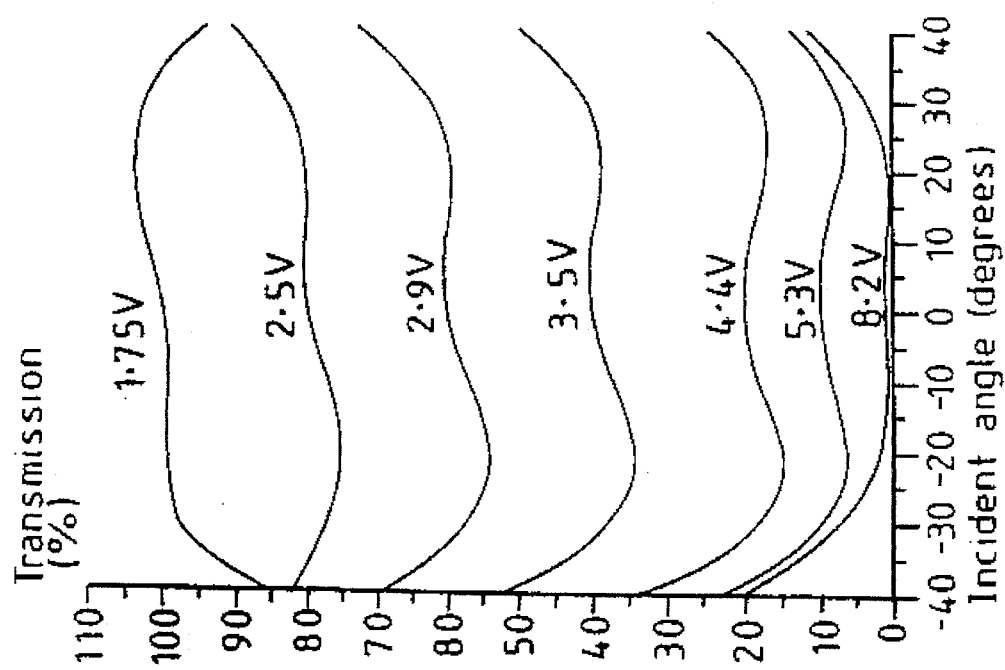
Figure 24:
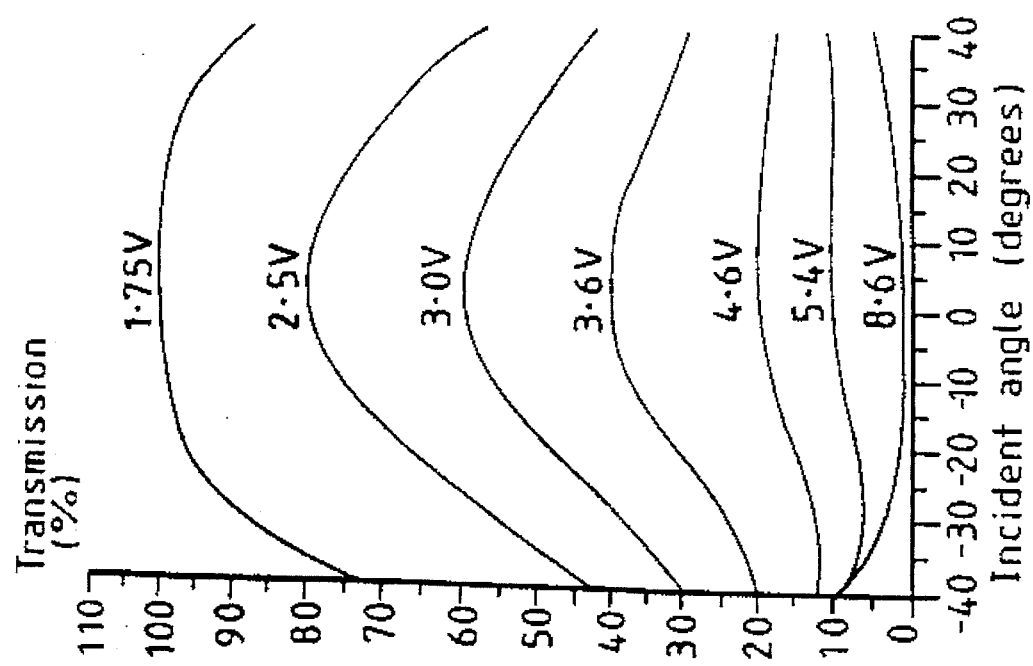
Figure 23:
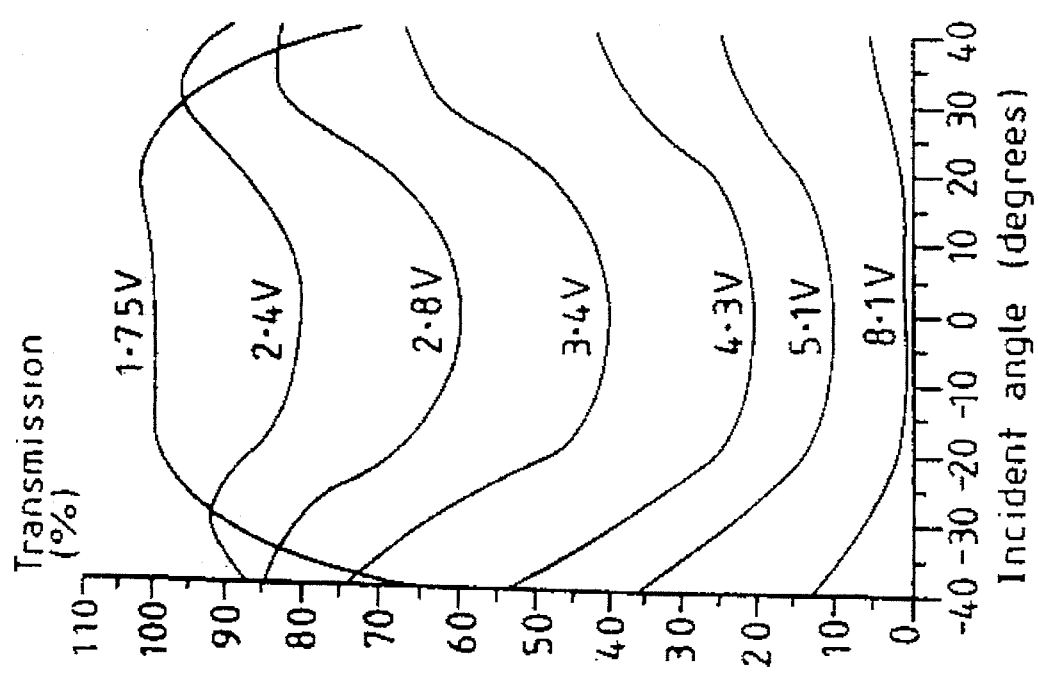

FIGS. 21 and 22 are graphs similar to FIGS. 19 and 20, respectively, for a display of the type shown in FIG. 6 and including a negative retarder; and FIGS. 23 and 24 are graphs similar to FIGS. 21 and 22, respectively, for a display of the type shown in FIG. 6 and including another negative retarder.

Figure 1:
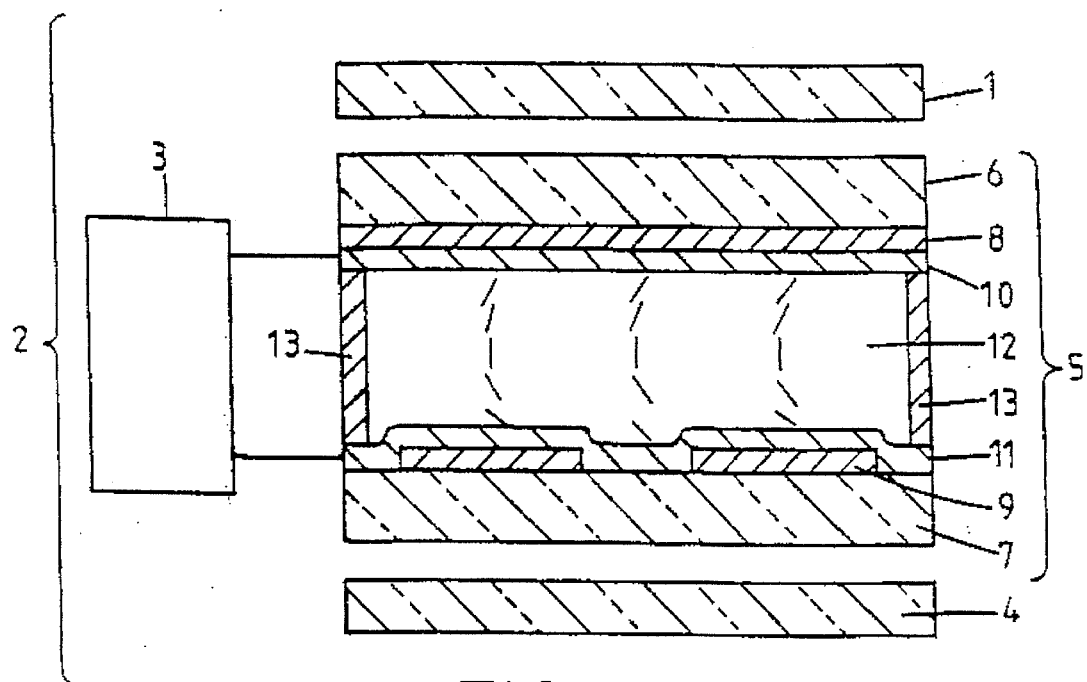
FIG. 1 is a diagrammatic cross sectional view of a pi-cell type liquid crystal display constituting an embodiment of the invention.
Figure 4:
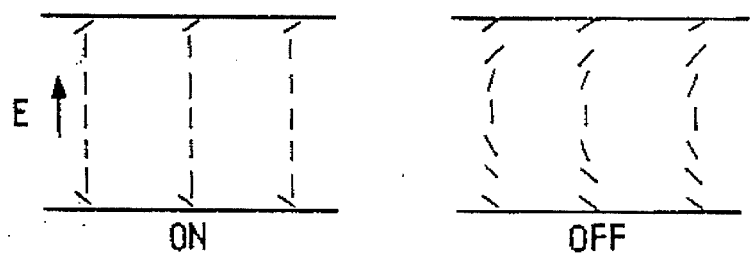
FIG. 4 is a cross sectional diagrammatic view showing the orientations of liquid crystal molecules in the ON and OFF states in a pi-cell.
Figure 5:
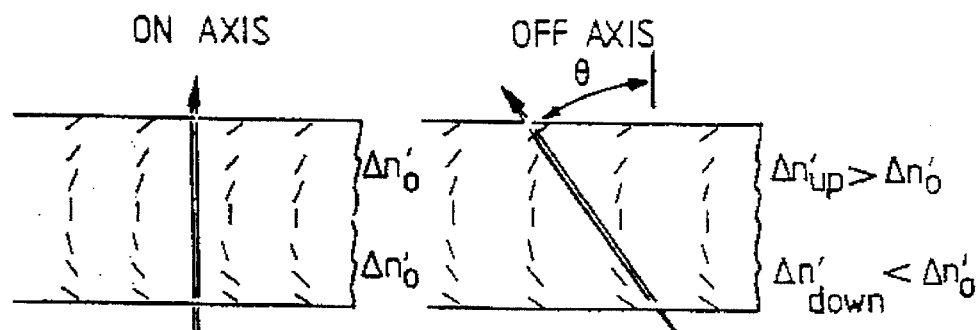
FIG. 5 illustrates the "on axis" and "off axis" light transmission characteristics of the liquid crystal layer in a pi-cell in the OFF state.

The liquid crystal display 2 shown in FIG. 1 comprises a liquid crystal display element 5 disposed between polarising plates 1 and 4. The liquid crystal display element 5 comprises a glass substrate 6 on which is formed a transparent electrode 8 and an alignment film 10. The alignment film 10 is spaced from a further alignment film 11 by a spacer 13 and a liquid crystal layer 12. A further glass substrate 7 has formed thereon transparent electrodes 9 and the alignment layer 11. The electrodes 8 and 9 are connected to a drive circuit 3. The alignment layers 10 and 11 are arranged such that the liquid crystal molecules are aligned as illustrated by the short lines within the liquid crystal layer 12 so as to form a pi-cell whose operation is illustrated in FIGS. 4 and 5. In particular, the liquid crystal molecule pretilt angles at the surfaces of the alignment layers 10 and 11 are parallel to each other.

Other materials may be used for the liquid crystal display. For instance, the substrates 6 and 7 may be made of transparent plastics. In another embodiment, one of the substrates may be reflective and may be made of silicon.

The polarising plates 1 and 4 are aligned such that their polarising directions are substantially at 45° to the pretilt angles of the liquid crystal molecules at the alignment layers 10 and 11. The polarising directions of the plates 1 and 4 may be parallel or perpendicular to each other.

In a first example of a liquid crystal display of the type shown in FIG. 1, the liquid crystal material of the layer 12 is E7 (refractive index anisotropy $\Delta n=0.22$) made by Merck.

The value of the product $d \cdot \Delta n$ of the liquid crystal cell is made equal to 2.2 μm by making the thickness d of the liquid crystal layer 12 equal to 10 μm. For the alignment films 10 and 11, a polymide resin made by Japan Synthetic Rubber Co., Ltd., is used. For alignment treatment, the material is rubbed with nylon fabric. By this rubbing treatment, the pretilt angle of the liquid crystal molecules on the surfaces of upper and lower alignment films 10 and 11 is made equal, for instance, to 10°, and the pretilt angles on the surfaces of the upper and lower films 10 and 11 are arranged to be parallel to each other.

Figure 3:
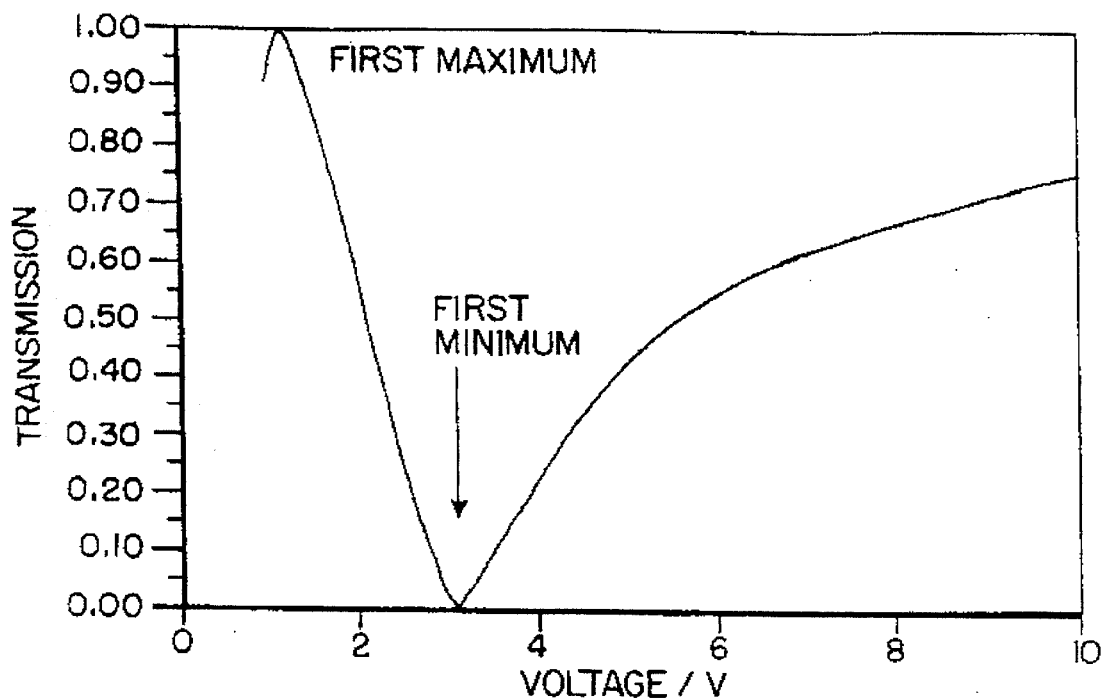
FIG. 3 is a graph showing the applied voltage vs. transmittance characteristics of the pi-cell display of FIG. 1.

FIG. 3 shows the results of measurement of the light transmittance vs. applied voltage characteristics along the direction of the normal to the thus-prepared liquid crystal cell. As is evident from this data, a high contrast display can be obtained by adjusting the drive circuit so that the off-voltage is set of 1.5 V (1st max.) and the on-voltage is set to 3.1 V (1st min). Thus, such a cell can be driven by voltages which are substantially less than 5 V, which is the existing limit value for active matrix drive.

Visual observation has shown that such a pi-cell has reduced appearance of contrast inversion when voltage is applied, and has wide viewing angle characteristics.

Second and third examples of a liquid crystal display of the type shown in FIG. 1 differ from the first example in that the liquid crystal layer thickness d is 5 μm and 12.5 μm and the value of the product $d \times \Delta n$ is 1.1 μm and 2.75 μm, respectively. As a result, it was found that liquid crystal cells having $d \times \Delta n$ equal to 1.1 μm or 2.75 μm give almost the same results as those obtained for the first example. In particular, contrast inversion is reduced and the viewing angle characteristics are remarkably widened.

Liquid crystal displays of the type shown in FIG. 1 were evaluated with respect to reduction of drive voltage, response characteristics, and viewing angle characteristics. From this evaluation, it was found desirable to set the optimum $d \times \Delta n$ of the pi-cell in the range of about 1.1 μm to about 2.75 μm for practical applications. If the value of $d \times \Delta n$ was lower than this limit, the required drive voltage exceeded 5 V. If the value of $d \times \Delta n$ exceed this limit, the viewing angle characteristics were impaired.

Figure 2A:
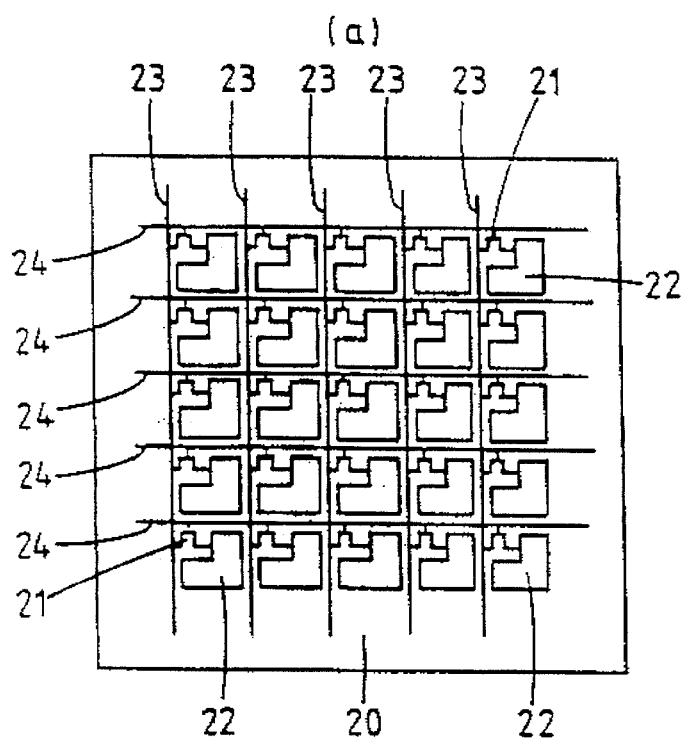
FIG. 2 (2a and 2b) illustrates the structure of an active matrix drive display whose display elements are of the type shown in FIG. 1.
Figure 2B:
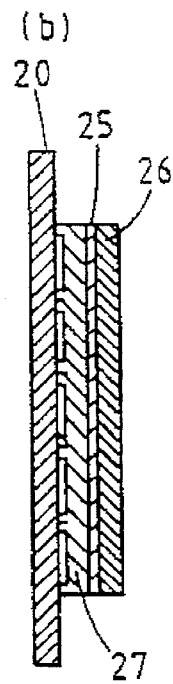

FIG. 2 shows an active matrix drive liquid crystal panel using the pi-cells of the type shown in FIG. 1. The panel comprises a first substrate 20 on which a switching transistor 21 and a display picture element electrode 22 are formed at each intersection point of signal electrodes 23 and scan electrodes 24. A counter electrode 25 is formed on a second substrate 26. A pi-cell mode liquid crystal layer 27 is arranged between the first and second substrates 20 and 26. The switching transistors 21 were formed as a-Si or p-Si thin film transistors (TFT).

An example of an active matrix drive liquid crystal panel of this type shown in FIG. 2 was made using the same liquid crystal material and the same liquid crystal layer thickness d as for the first example of the display shown in FIG. 1. This panel also provided a substantially improved viewing angle, and reduced appearance of contrast inversion.

FIG. 6 shows a liquid crystal display which is similar to that shown in FIG. 1. The same reference numerals refer to corresponding parts which will not be further described. The display of FIG. 6 differs from that of FIG. 1 in that the thickness of the liquid crystal layer 12 is reduced and phase plates or films 30 and 31 are provided on opposite sides of the liquid crystal display element 5 between the element and the polarisers 1 and 4. Although two phase plates 30 and 31 are shown, a single phase plate may be provided in either of these positions.

An example of a display of the type shown in FIG. 6 differs from the first example of the display shown in FIG. 1 in that the thickness d of the liquid crystal layer 12 is 6.5 µm so that the value of d×Δn is 1.4 µm. A single phase plate of retardation 0.14 µm is provided. Such a display has substantially the same properties and characteristics as the first example of the display shown in FIG. 1 described hereinbefore. In particular, the viewing angle is substantially widened and the appearance of contrast inversion is substantially reduced.

For pi-cells of the type shown in FIGS. 1, 2, and 6, when a voltage is applied to the liquid crystal layer, the tilt directions of the liquid crystal molecules in the upper and lower halves of the liquid crystal layer are mutually inverted as shown in FIG. 5. If light is incident "off axis" on such a liquid crystal layer from, for example, the direction of viewing angle θ with respect to the normal in FIG. 5, the phase differences between ordinary light and extraordinary light components (hereinafter referred to as retardation value) in the upper and lower halves of the liquid crystal layer differ from each other. For example, in FIG. 5 for θ>0, the retardation value in the lower half of the liquid crystal layer ($R_{low}=\Delta n'_{low} \times d/2$) is low but the retardation value in the upper half of liquid crystal layer ($R_{up}=\Delta n'_{up} \times d/2$) is high. Consequently, the retardation value ($R_{low}+R_{up}$) of the whole liquid crystal layer does not depend strongly on the viewing angle θ and becomes almost equal to the value ($\Delta n'_0 \times d$) in the direction of the normal (θ=0°) in FIG. 5, so that the display contrast does not depend strongly on the viewing angle. Accordingly, compensation for the light phase difference occurs in the upper and lower layers of the liquid crystal, so that the dependence upon the viewing angle is improved. The parameter Δn' mentioned above represents the apparent refractive index anisotropy which is seen by light passing through the layer at a visual angle θ. The compensation of the light phase difference which occurs in the upper and lower halves of a pi-cell is in marked contrast to the reinforcement which occurs in TN cells and contributes to the narrow viewing angle characteristic of TN cells.

The reduced dependence of transmission on viewing angle in a pi-cell holds not only for the ON and OFF states but also for any intermediate state corresponding to a grey scale in a display. Furthermore, the incorporation of one or more phase plates or films shows some advantages by allowing the use of thinner cells and lowering switching times.

Figure 7:
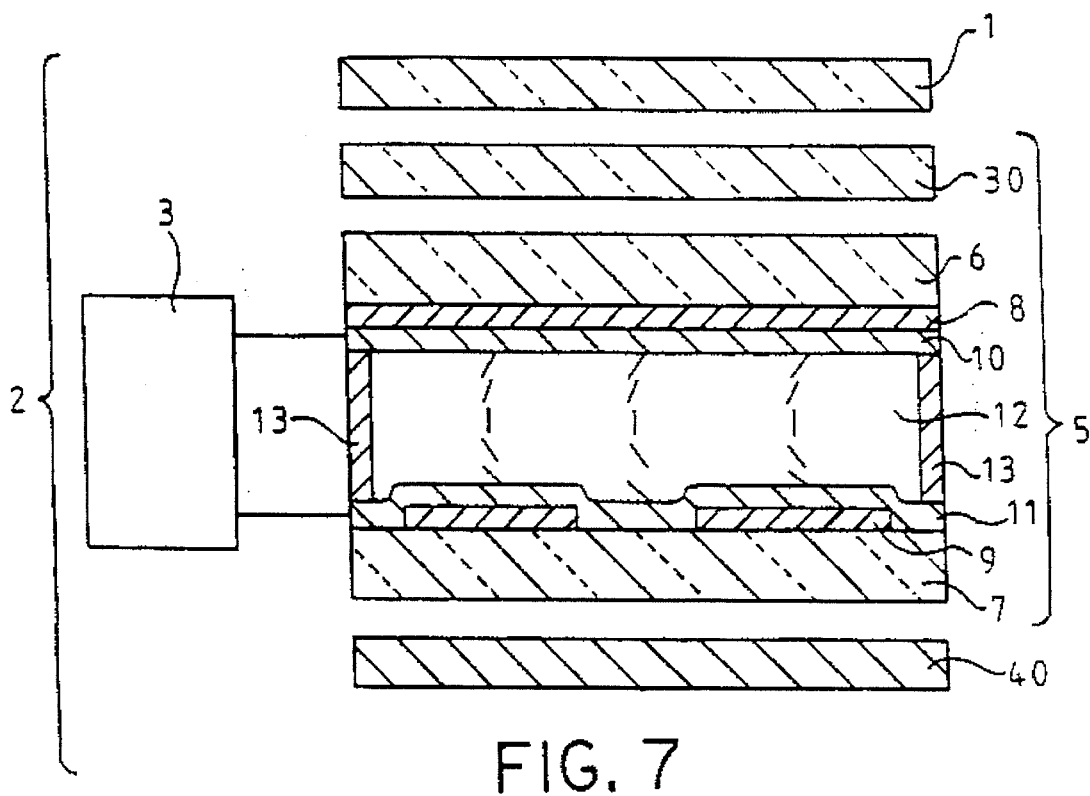
FIG. 7 is a diagrammatic cross sectional view of a pi-cell reflection mode liquid crystal display constituting a further embodiment of the invention.

The liquid crystal display shown in FIG. 7 is of the reflective type whereas the displays shown in FIGS. 1, 2 and 6 are of the transmissive type. The display of FIG. 7 differs from that of FIG. 6 in that the polariser 4 and the retarder 31 of FIG. 6 are omitted and a mirror or other reflector 40 is provided. Alternatively, the substrate 7 may be reflective and may, for instance, be made of silicon. Thus, light incident on the display from above in FIG. 7 passes through the polarising plate 1 and the liquid crystal display element 5 and is then reflected by the mirror 40 back through the element 5 and the plate 1. It is thus possible to make the display element 5 and, in particular, the liquid crystal layer 12 thinner and this permits an increase in the switching speed of the display.

Figure 8:
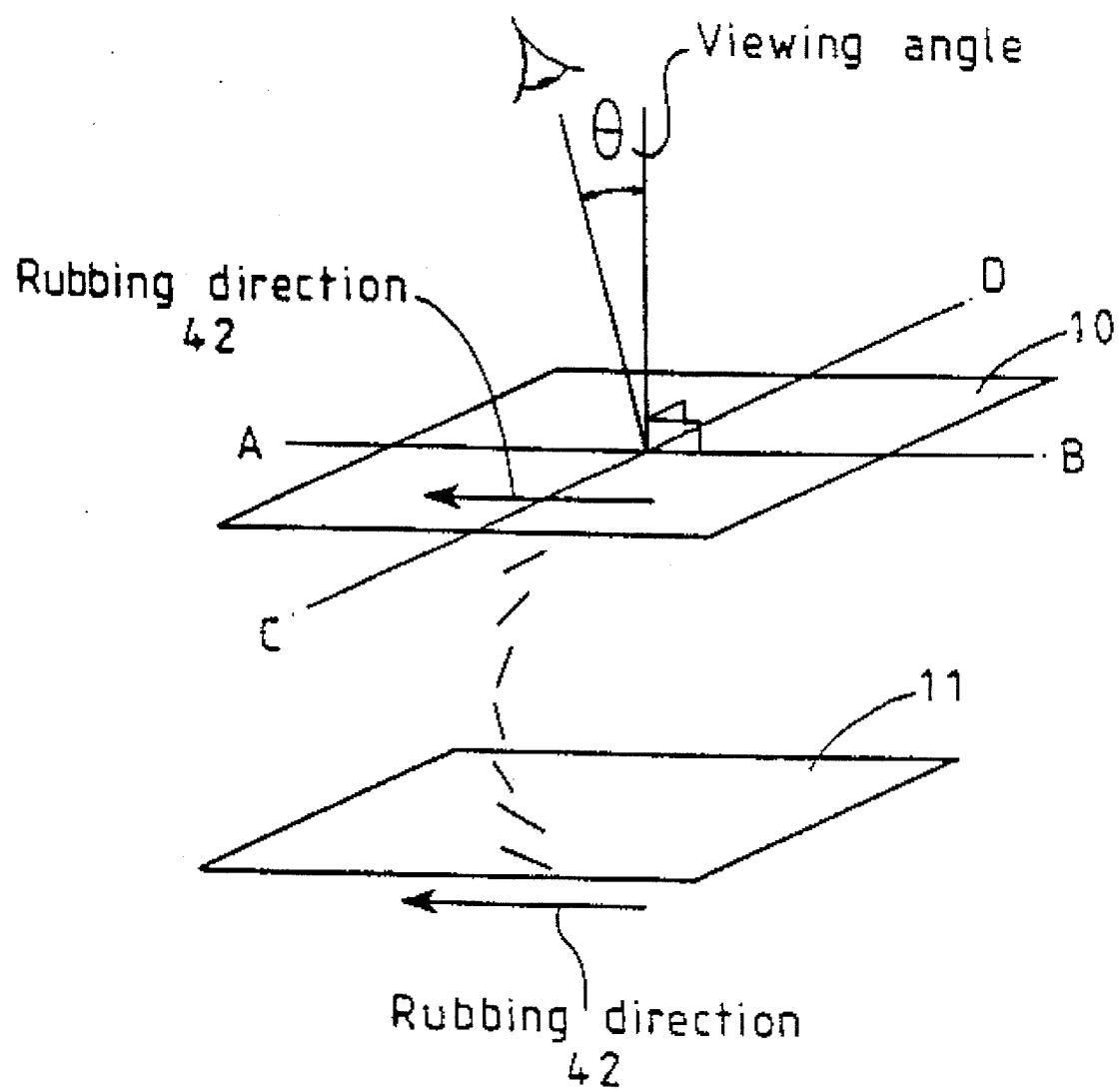
FIG. 8 is a diagrammatic view of a pi-cell illustrating a definition of viewing angle.

FIG. 8 illustrates a diagrammatically a basic pi-cell. In particular, this diagram shows the alignment films 10 and 11 with the parallel 'rubbing directions' being shown by the arrows 42. The contrast varies with viewing angle and, in order to assess this, viewing angles are considered in two planes which are orthogonal to each other. The first (AB) plane is perpendicular to the alignment layers 10 and 11 but parallel to the rubbing direction 42 whereas the second 'CD' plane is perpendicular to the alignment layers 10 and 11 and perpendicular to the rubbing direction 42.

Figure 9:
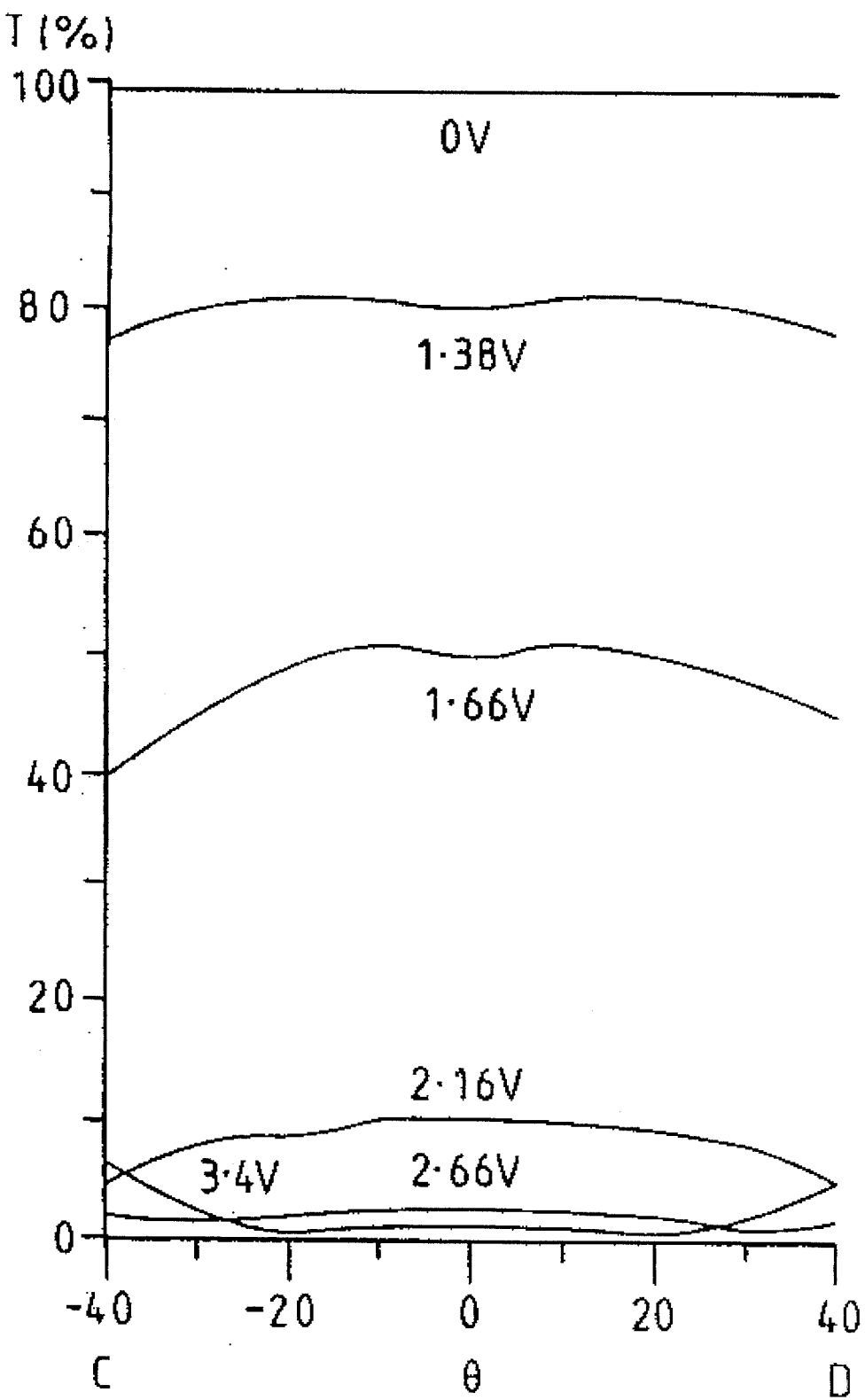
FIGS. 9 and 10 are graphs of light transmission T in percent against viewing angle in CD and AB planes, respectively, for different drive voltages for a known TN display.
Figure 10:
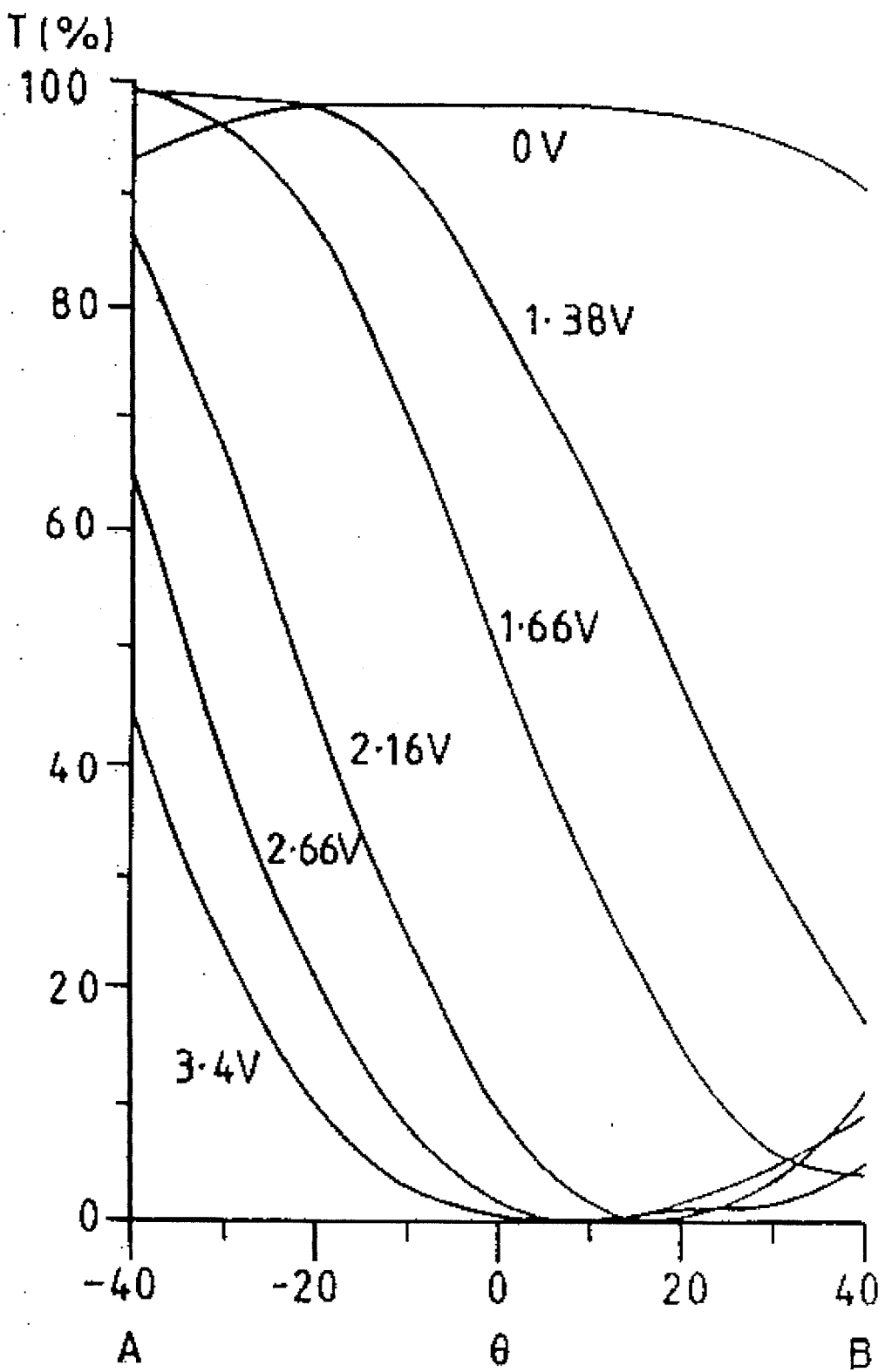

FIGS. 9 and 10 illustrate the percentage transmission of light of standard known TN displays for various viewing angles in the CD and AB planes, respectively. Light transmission for each of the drive voltages shown adjacent the respective curves varies relatively little with viewing angle in the CD plane as shown in FIG. 9 but there are large variations with viewing angle in the AB plane shown in FIG. 10. Thus, in the AB plane, conventional TN displays have relatively poor and asymmetrical viewing angle and suffer from contrast inversion.

Figure 11:
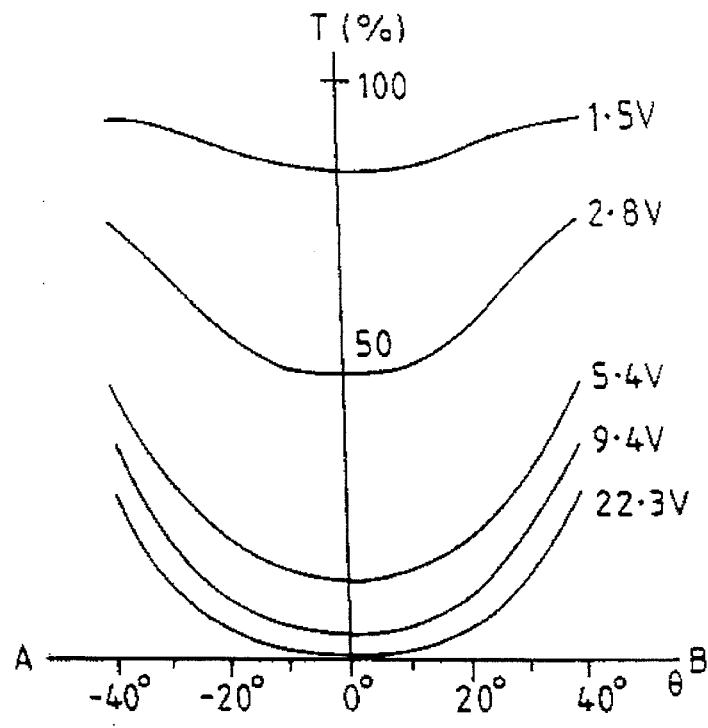
FIGS. 11 and 12 are graphs similar to FIGS. 10 and 9, respectively, for a known pi-cell display.
Figure 12:
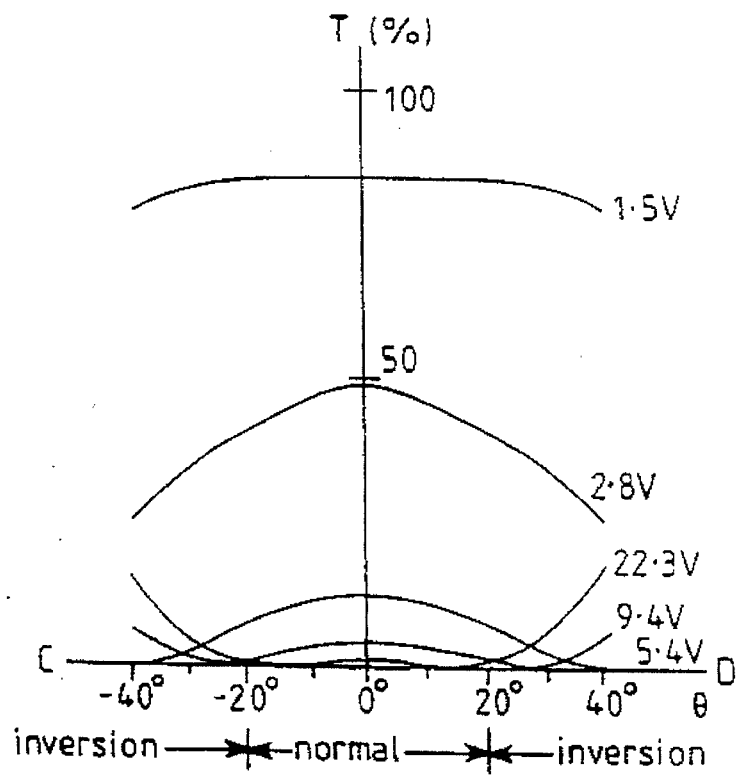

FIGS. 11 and 12 correspond to FIGS. 10 and 9, respectively, for known pi-cells of the type shown in FIG. 8 and disclosed by Boss (see above). In order to achieve acceptable contrast between the on and off states of such pi-cells, drive voltages in excess of 20 volts are required. Although the switching speeds of pi-cells are of the order of 2 milliseconds and are therefore an order of magnitude faster than those for conventional TN displays, displays based on pi-cells of the type shown in FIG. 8 have limited viewing angles in the CD plane. As shown in FIG. 12, such displays suffer from contrast inversion for viewing angles in excess of + and −20° in the CD plane.

Figure 13:
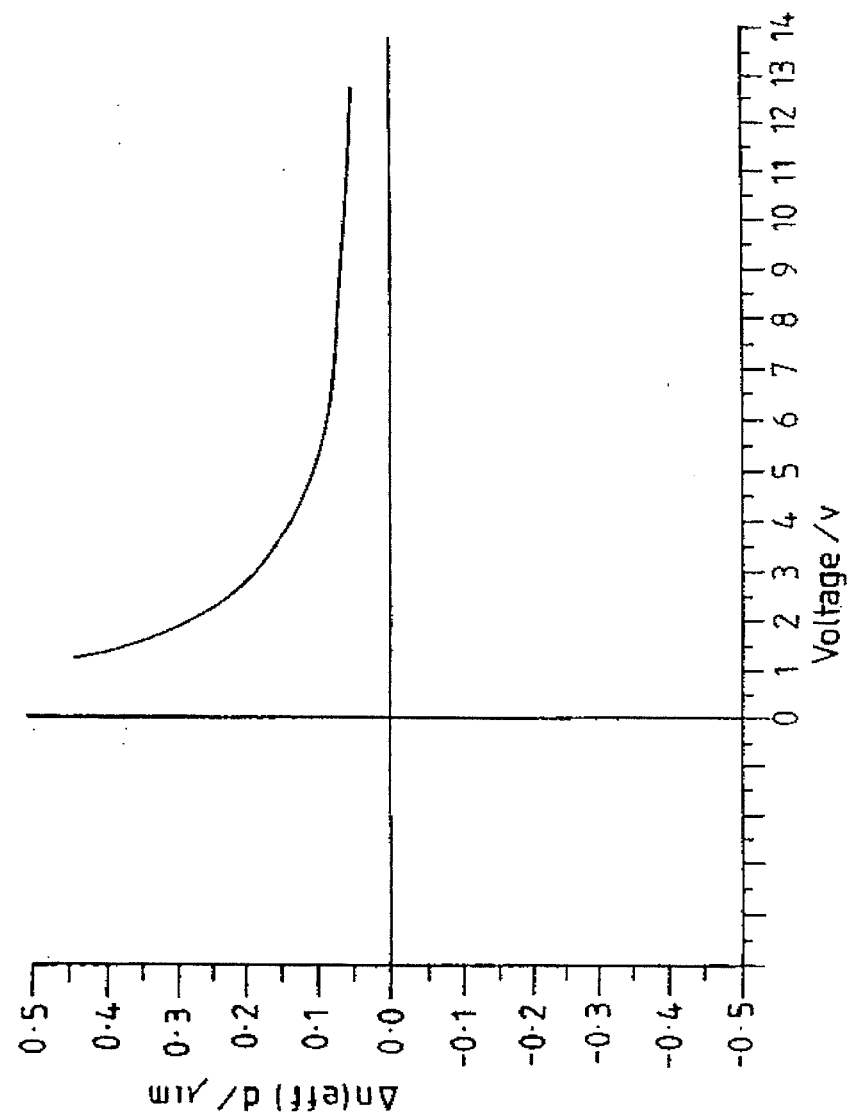
FIG. 13 is a graph of retardance in micrometres against drive voltage for a known pi-cell display.

FIG. 13 illustrates the retardance of a pi-cell of the type shown in FIG. 8 against drive voltage for zero viewing angle. For increasing drive voltages, the retardance decreases asymptotically towards zero but does not reach zero for permissible drive voltages. As the drive voltage is reduced, the pi-cell approaches an unstable state in which the liquid crystal molecules are no longer stably aligned perpendicular to the alignment layers in the middle region of the liquid crystal cell. In order to achieve the zeroth minimum light transmission, in which state the liquid crystal display would substantially block the passage of light, the retardance is required to be equal to zero at a permissible drive voltage, but this is not possible with conventional pi-cells. A first maximum light transmission can be achieved with such cells with drive voltages of the order of 1.5 volts, which drive voltages are sufficiently high to avoid the instability mentioned above. These maximum and minimum transmissions are achieved for mutually perpendicular polarisers. For parallel polarisers, although the first minimum can be achieved at a drive voltage of the order of 1.5 volts, the zeroth maximum cannot be achieved because this requires zero retardance.

As described hereinbefore, by choosing a liquid crystal of the appropriate positive dielectric constant anisotropy and by making the liquid crystal layer of the appropriate thickness, it is possible to arrange for the first maximum and the first minimum to occur for drive voltages which are above the unstable region of operation, finite, and sufficiently low to permit such liquid crystal displays to be driven, for instance by thin film transistors. This is illustrated in FIG. 3 and described hereinbefore.

Figure 14:
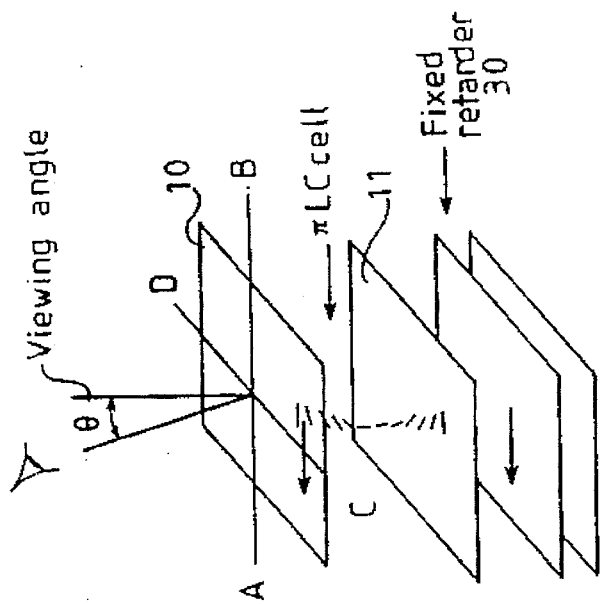
FIG. 14 is a diagrammatic view of a p i-cell of the type shown in FIG. 6.

FIG. 14 illustrates diagrammatically the type of pi-cell shown in FIG. 6 and including, in this case, a fixed retarder or phase plate 30. The use of the fixed retarder 30 allows the thickness of the liquid crystal layer to be reduced, thus improving the switching speed of the display. However, the retarder adjusts the total retardance of the display in such a way as to permit the zeroth minimum (or maximum) to be attained at a finite drive voltage.

Figure 15:
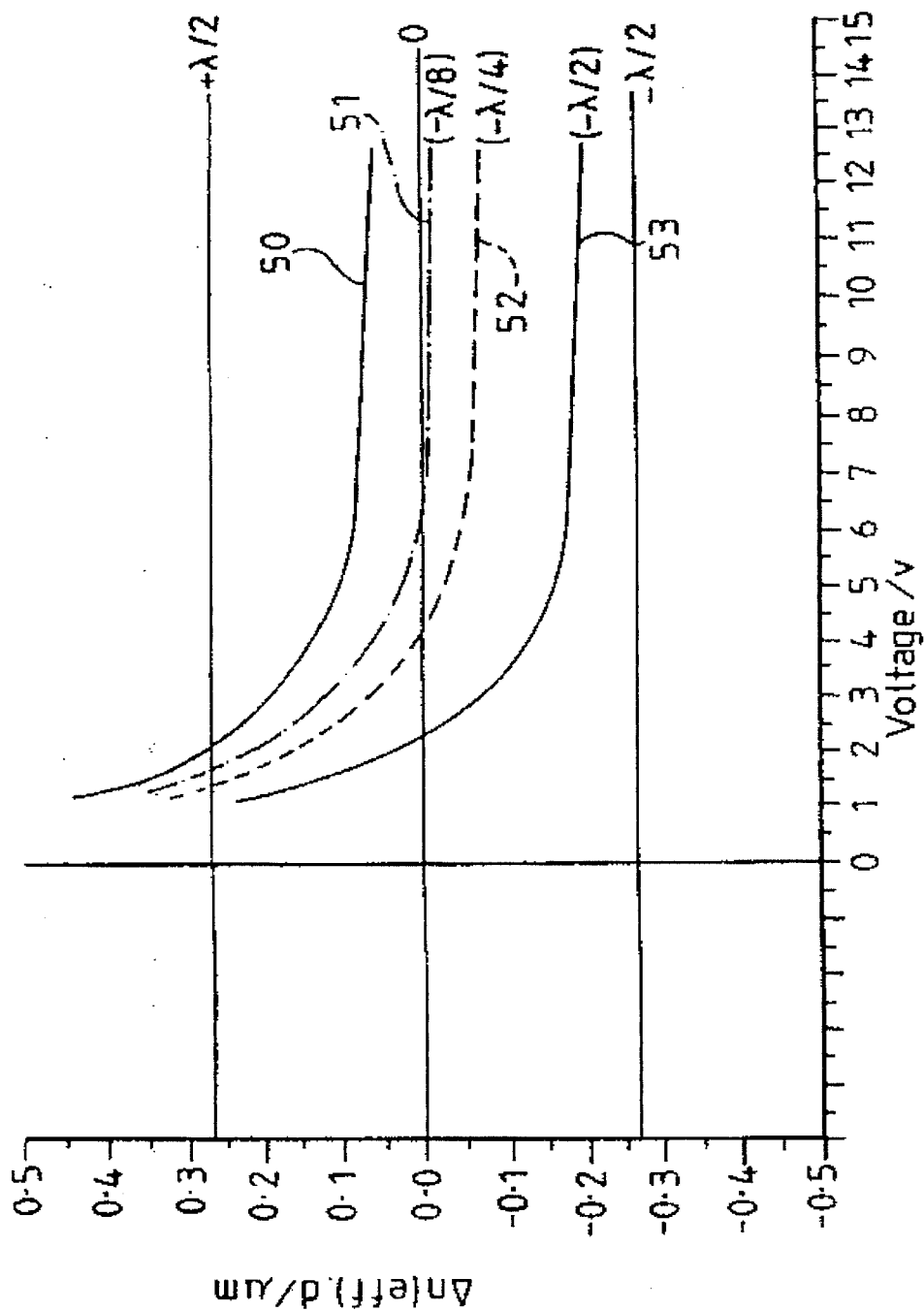
FIG. 15 is a set of graphs of retardance in micrometres against drive voltage for several pi-cell displays including embodiments of the present invention.

This effect is illustrated in FIG. 15 which shows at 50 the "uncompensated" retardance which is identical to the curve shown in FIG. 13. The effects of fixed retarders 30 of different retardances are illustrated by the curves 51 to 53. The curve 51 illustrates the combined retardance of the liquid crystal layer and a λ/8 retarder 30 whereas the curves 52 and 53 show the effects of λ/4 and λ/2 retarders. The fixed retarder 30 provides negative retardance which subtracts from the retardance of the liquid crystal layer so as to provide zero retardance of the display at finite drive voltages i.e. where each curve 51 to 53 crosses the zero retardance axis. These curves therefore differ from the curve 50 which does not cross the zero retardance axis but instead approaches it asymptotically. Thus, the curves 51 to 53 permit the zeroth minimum (or maximum) to be achieved for drive voltages of approximately 6 volts, approximately 4 volts, and approximately 2.5 volts, respectively.

The horizontal lines in FIG. 15 indicated as +λ/2 and −λ/2 correspond to the positive and negative first maxima and, in order for the liquid crystal device to function correctly, the corresponding retardance curve is required to intersect one of these lines. The curves 51 and 52 intersect the +λ/2 line for drive voltages at which the liquid crystal display is stable, but the curve 53 does not. Accordingly, the fixed retarder 30 could be a λ/8 or λ/4 retarder and the liquid crystal display would operate at its first maximum and zeroth minimum at acceptable drive voltages. In the example illustrated, the use of a λ/2 retarder would not give acceptable operation.

Figure 16:
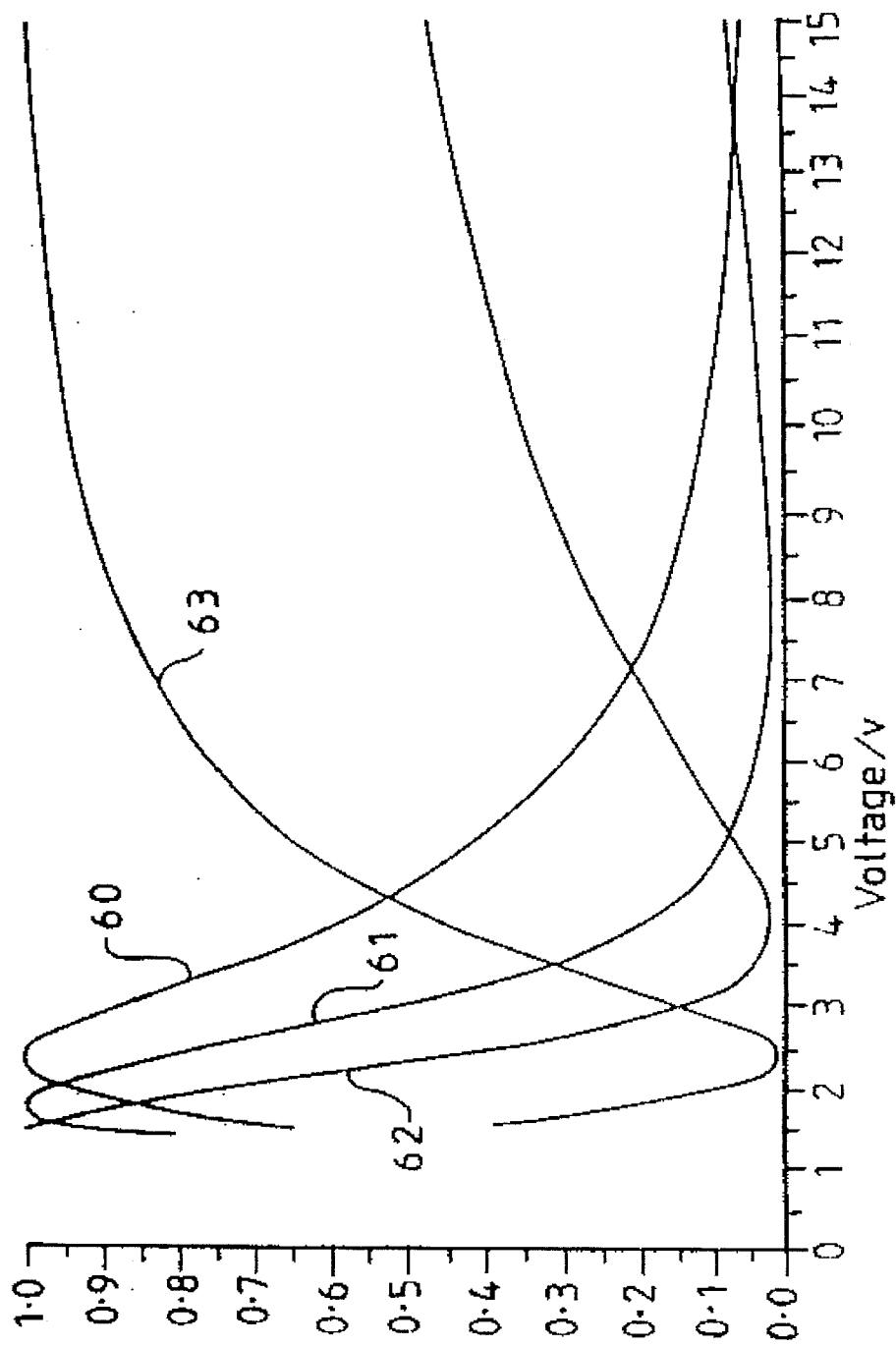
FIG. 16 is a set of graphs of light transmission as a proportion against drive voltage for several pi-cell displays including embodiments of the present invention.

FIG. 16 illustrates the dependence of transmission on drive voltage for the displays corresponding to the curves 50 to 53 in FIG. 15. The curve 60 in FIG. 16 represents the light transmission of a pi-cell without a fixed retarder and corresponds to the curve 50 in FIG. 15. As is clear from the curve 60 in FIG. 16, the first maximum is achieved at approximately 1.5 volts but the zeroth minimum is approached asymptotically. The curve 63 corresponds to a λ/2 retarder and shows that the zeroth minimum is achieved but the negative first maximum is approached asymptotically. The curves 61 and 62 correspond to the curves 51 and 52 in FIG. 15 and show that the zeroth minimum and first maximum are achieved for λ/8 and λ/4 retarders 30.

In theory, the fixed retarder 30 may have any value of retardance other than a value equal to an integer multiple of λ/2 but, in practice, the retardance of the retarder 30 is chosen such that a maximum and an adjacent minimum in light transmission are achieved at usable or convenient drive voltages. For pi-cells without fixed retarders, this is achieved by ensuring that the retardance of the liquid crystal layer is equal to (M+1)λ/2 and Mλ/2 at acceptable drive voltages, where M is an integer greater than zero or less than −1. For pi-cells having fixed retarders, the same expressions apply but M may then be any integer including zero and −1, where the retardance is the combined retardance of the retarder and the liquid crystal layer.

Figure 17:
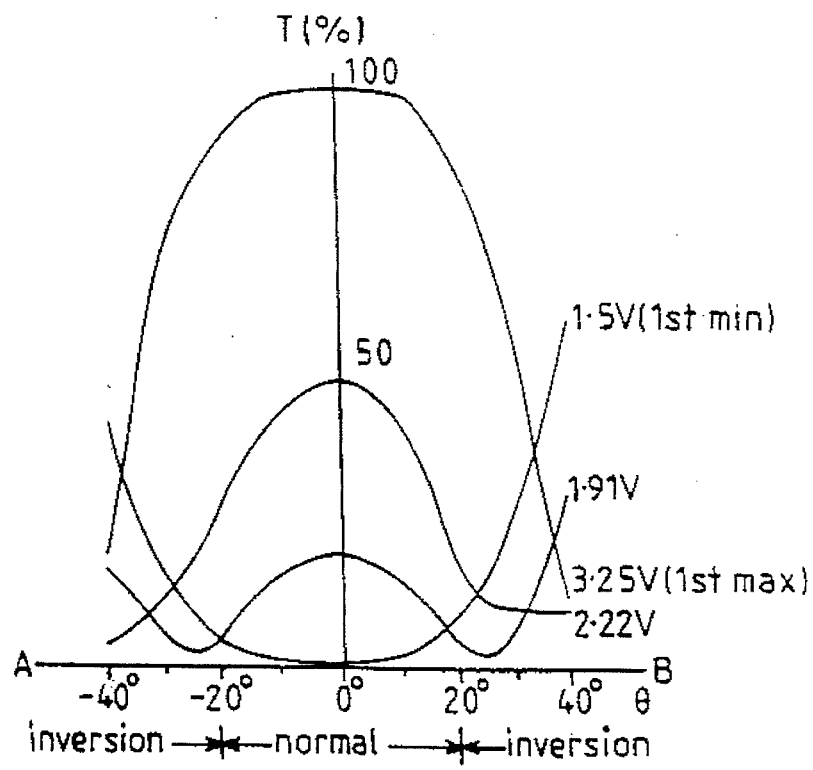
FIGS. 17 and 18 are graphs similar to FIGS. 11 and 12, respectively, for a display of the type shown in FIG. 1.
Figure 18:
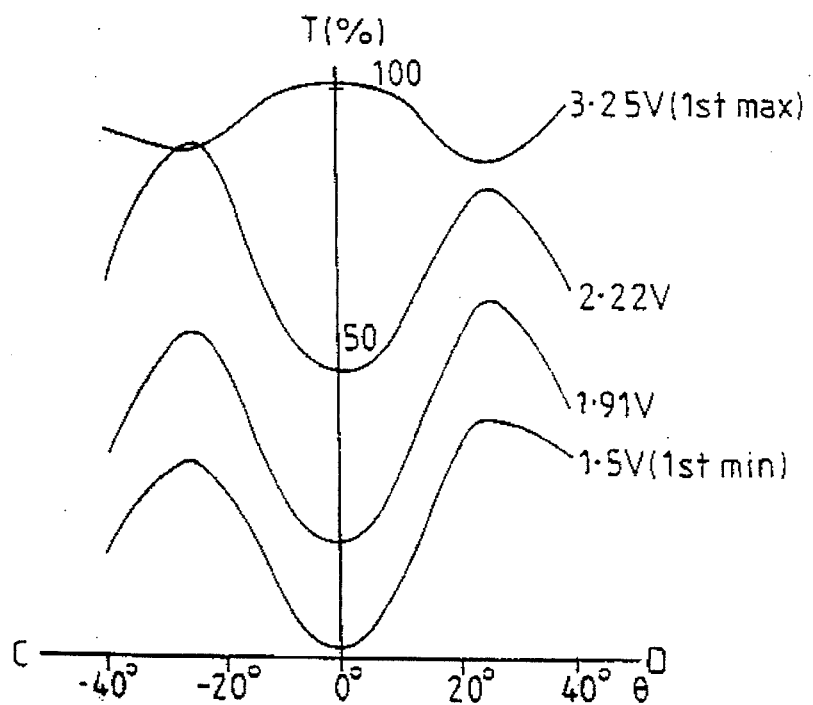

FIGS. 17 and 18 illustrate the dependence of transmission on viewing angle in the AB and CD planes, respectively, for a pi-cell without a fixed retarder operating between the first maximum and first minimum. In particular, the curves relate to a liquid crystal layer 8.8 micrometres thick and comprising E7 liquid crystal. In FIG. 17, the "normal" and "inversion" regions corresponding to a pi-cell of the type whose performance is illustrated by the curves 50 and 60 in FIGS. 15 and 16, respectively, are shown for comparison.

FIGS. 19 and 20 illustrate the performance of a liquid crystal display of the type shown in FIG. 14 in which a five micrometre layer of E7 liquid crystal material is used in combination with a fixed 52 nanometre retarder 30. The acceptable range of viewing angles is substantially increased as compared with known types of pi-cells. In particular, the "inversion" region does not occur until ±30° viewing angles in the AB plane as compared with ±20° for the conventional pi-cell.

FIGS. 21 and 22 correspond to FIGS. 19 and 20, respectively, for the same device but with the inclusion of a fixed negative 441 nanometre retarder providing negative retardance in the direction of zero viewing angle. By compensating at least partly for the retardance of the liquid crystal layer in this direction, the performance of the display is substantially improved with regard to contrast and viewing angle. FIGS. 23 and 24 correspond to FIGS. 21 and 22 and illustrate the operation of a display in which the negative retarder provides a fixed negative retardance of 882 nanometres in the direction of zero viewing angle. Again, the contrast and viewing angle performance of the display are substantially improved. It is thus possible to provide a substantially symmetrical viewing angle which may be up to ±40° while maintaining acceptable contrast performance and avoiding contrast inversion.

The switching speeds of three examples of displays constituting embodiments of the invention were measured in order to assess the switching performance. For a display of the type shown in FIG. 6 having a liquid crystal layer 5 micrometres thick of E7 liquid crystal together with a single fixed 72 nanometre retarder, the switching time from maximum to minimum light transmission was 0.3 milliseconds whereas the switching time from minimum to maximum light transmission was 1.8 milliseconds. For a reflection mode display of the type shown in FIG. 7 and having a liquid crystal layer 5 micrometres thick of E7 liquid crystal together with a fixed positive 174 nanometre retarder, the switching time from maximum to minimum transmission was 0.22 milliseconds whereas the switching time from minimum to maximum transmission was 0.77 milliseconds. For a reflection mode display having a liquid crystal layer 2 micrometres thick of E7 liquid crystal with a fixed positive 152 nanometre retarder, the switching time from maximum to minimum transmission was 0.07 milliseconds whereas the switching time from minimum to maximum transmission was 0.55 milliseconds.

It is therefore possible to provide liquid crystal devices for display and other purposes with performances which are substantially improved as compared with known TN and pi-cell types. The switching speeds can be substantially improved both in transmission and reflection modes with the reflection mode providing a particularly significant improvement in speed compared with known pi-cells. The contrast performance is substantially improved as compared with known pi-cells while permitting the devices to be operated at sufficiently low drive voltages to allow active matrix drive to be employed, for instance using thin film transistors. The range of viewing angles can be substantially increased compared with both known TN and known pi-cell devices.

What is claimed is:

1. An active matrix liquid crystal display comprising:

a first substrate on which are formed a plurality of switching elements and display picture element electrodes;

a second substrate on which is formed at least one counter electrode facing the display picture element electrodes;

first and second alignment films disposed on facing surfaces of the first and second substrates, respectively; and a nematic liquid crystal layer having a positive dielectric constant anisotropy and disposed between the first and second alignment films, the first and second alignment films being arranged so that the liquid crystal molecule pretilt angles at the surfaces of the first and second alignment films are substantially parallel to each other, wherein the liquid crystal layer has a retardance substantially equal to $(M+1)\lambda/2$ at a first operating voltage of the display and substantially equal to $M\lambda/2$ at a second operating voltage of the display, where M is an integer greater than zero or less than minus one and $\lambda$ is a wavelength of visible light.

2. A display as claimed in claim 1, further comprising a reflector for reflecting back through the liquid crystal layer light which has passed through the liquid crystal layer.

3. A display as claimed in claim 2, wherein the liquid crystal layer has a retardance substantially equal to $(M+1)\lambda/4$ at a first operating voltage of the display and substantially equal to $M\lambda/4$ at a second operating voltage of the display, where M is an integer and $\lambda$ is a wavelength of visible light.

4. A display as claimed in claim 3, wherein M is an integer greater than zero or less than minus one.

5. A display as claimed in claim 1, wherein the liquid crystal layer has a thickness d, the nematic liquid crystal has a refractive index anisotropy $\Delta n$, and a product $d \times \Delta n$ is between substantially 1.1 μm and substantially 2.75 μm.

6. A display as claimed in claim 1, further comprising at least one phase plate.

7. A display as claimed in claim 6, wherein the combined retardance of the phase plate or all of the phase plates and the liquid crystal layer is substantially equal to $(M+1)\lambda/2$ at a first operating voltage of the display and is substantially equal to $M\lambda/2$ at a second operating voltage of the display, where M is an integer and $\lambda$ is a wavelength of visible light.

8. A display as claimed in claim 7, wherein M is equal to zero and the second operating voltage is larger than the first operating voltage.

9. A display as claimed in claim 6, further comprising a reflector for reflecting back through the or each phase plate and the liquid crystal layer light which has passed through the or each phase plate and the liquid crystal layer.

10. A display as claimed in claim 9, wherein the combined retardance of the phase plate or all of the phase plates and the liquid layer is substantially equal to $(M+1)\lambda/4$ at a first operating voltage of the display and is substantially equal to $M\lambda/4$ at a second operating voltage of the display, where M is an integer and $\lambda$ is a wavelength of visible light.

11. A display as claimed in claim 10, wherein M is equal to zero and the second operating voltage is larger than the first operating voltage.

12. A display as claimed in claim 6, wherein a negative retardance phase plate has a negative retardance in a direction of passage of light therethrough.

13. A display as claimed in claim 12, wherein the negative retardance of the negative retardance phase plate has a magnitude which is substantially equal to that of a positive retardance of the remainder of the display in the direction of passage of light therethrough.

14. A display as claimed in claim 1, further comprising at least one polariser having a polarising direction aligned at substantially 45° to the liquid crystal molecule pretilt angles.

15. A liquid crystal device comprising:

first and second alignment layers; and a nematic liquid crystal layer disposed between the first and second alignment layers and having a positive dielectric constant anisotropy, the first and second alignment layers being arranged to provide first and second liquid crystal molecule pretilt angles, respectively, at the surfaces of the first and second alignment layers which first and second angles are substantially parallel to each other, further comprising at least one phase plate, wherein the combined retardance of the phase plate or all of the phase plates and the liquid crystal layer is substantially equal to $(M+1)\lambda/2$ at a first operating voltage of the device and is substantially equal to $M\lambda/2$ at a second operating voltage of the device, where M is an integer and $\lambda$ is a wavelength of optical radiation.

16. A device as claimed in claim 15, further comprising a reflector for reflecting back through the or each phase plate and the liquid crystal layer optical radiation which has passed through the or each phase plate and the liquid crystal layer.

17. A device as claimed in claim 16, wherein the combined retardance of the phase plate or all of the phase plates and the liquid crystal layer is substantially equal to $(M+1)\lambda/4$ at a first operating voltage of the device and is substantially equal to $M\lambda/4$ at a second operating voltage of the device, where M is an integer and $\lambda$ is a wavelength of optical radiation.

18. A device as claimed in claim 17, where M is equal to zero and the second operating voltage is larger than the first operating voltage.

19. A device as claimed in claim 15, wherein the liquid crystal layer has a thickness d, the nematic liquid crystal has a refractive index anisotropy $\Delta n$, and a product $d \times \Delta n$ is between substantially 0.4 μm and substantially 2.4 μm.

20. A device as claimed in claim 19, wherein the product $d \times \Delta n$ is between substantially 0.8 μm and substantially 1.6 μm.

21. A device as claimed in claim 15, wherein the liquid crystal layer has a substantially constant thickness.

22. A device as claimed in claim 15, further comprising at least one polariser having a polarising direction aligned at substantially 45° to the liquid crystal molecule pretilt angles.

23. A liquid crystal device comprising:

first and second alignment layers; and a nematic liquid crystal layer disposed between the first and second alignment layers and having a positive dielectric constant anisotropy, the first and second alignment layers being arranged to provide first and second liquid crystal molecule pretilt angles, respectively, at the surfaces of the first and second alignment layers which first and second angles are substantially parallel to each other, further comprising at least one phase plate, wherein the combined retardance of the phase plate or all of the phase plates and the liquid crystal layer is substantially equal to $(M+1)\lambda/2$ at a first operating voltage of the device and is substantially equal to $M\lambda/2$ at a second operating voltage of the device, where M is an integer and $\lambda$ is a wavelength of optical radiation, and where M is equal to zero and the second operating voltage is larger than the first operating voltage.

24. A liquid crystal device including a nematic liquid crystal layer disposed between first and second alignment layers and having a positive dielectric constant anisotropy, the first and second alignment layers being arranged to provide first and second liquid crystal molecule pretilt angles, respectively, at the surfaces of the first and second alignment layers which first and second angles are substantially parallel to each other, wherein the liquid crystal layer has a retardance substantially equal to $(M+1)\lambda/2$ at a first operating voltage of the device and substantially equal to $M\lambda/2$ at a second operating voltage of the device, where M is an integer greater than zero or less than minus one and $\lambda$ is a wavelength of optical radiation.

25. A device as claimed in claim 24, wherein the liquid crystal layer has a thickness d and a refractive index anisotropy $\Delta n$ such that a product $d \times \Delta n$ is between substantially 1.1 µm and substantially 2.75 µm.

26. A device as claimed in claim 24, wherein the liquid crystal layer has a substantially constant thickness.

27. A device as claimed in claim 24, further comprising at least one polariser having a polarising direction aligned at substantially 45° to the liquid crystal molecule pretilt angles.

28. A liquid crystal device including a nematic liquid crystal layer disposed between first and second alignment layers and having a positive dielectric constant anisotropy, the first and second alignment layers being arranged to provide first and second liquid crystal molecule pretilt angles, respectively, at the surfaces of the first and second alignment layers which first and second angles are substantially parallel to each other, further comprising a reflector for reflecting back through the liquid crystal layer optical radiation which has passed through the liquid crystal layer, the liquid crystal layer having a retardance substantially equal to $(M+1)\lambda/4$ at a first operating voltage of the device and substantially equal to $M\lambda/4$ at a second operating voltage of the device, where M is an integer and $\lambda$ is a wavelength of optical radiation.

29. A device as claimed in claim 28, wherein M is an integer greater than zero or less than minus one.

30. A device as claimed in claim 28, wherein the liquid crystal layer has a substantially constant thickness.

31. A device as claimed in claim 28, further comprising at least one polariser having a polarising direction aligned at substantially 45° to the liquid crystal molecule pretilt angles.

* * * * *